US011420485B2

United States Patent
Greco et al.

(10) Patent No.: US 11,420,485 B2
(45) Date of Patent: Aug. 23, 2022

(54) METHOD FOR DETECTING A LEAK IN A TIRE OF A STATIONARY VEHICLE

(71) Applicant: COMPAGNIE GENERALE DES ETABLISSEMENTS MICHELIN, Clermont-Ferrand (FR)

(72) Inventors: Mathieu Greco, Clermont-Ferrand (FR); Olivier Muhlhoff, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 11 days.

(21) Appl. No.: 16/762,673

(22) PCT Filed: Nov. 6, 2018

(86) PCT No.: PCT/FR2018/052731
§ 371 (c)(1),
(2) Date: May 8, 2020

(87) PCT Pub. No.: WO2019/092352
PCT Pub. Date: May 16, 2019

(65) Prior Publication Data
US 2021/0170813 A1    Jun. 10, 2021

(30) Foreign Application Priority Data

Nov. 10, 2017  (FR) ...................................... 1760606

(51) Int. Cl.
*B60C 23/04*        (2006.01)
(52) U.S. Cl.
CPC ...... *B60C 23/0457* (2013.01); *B60C 23/0476* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24;
(Continued)

(56) References Cited

U.S. PATENT DOCUMENTS 5,537,090 A * 7/1996 Thomas .................. B60C 23/20
116/34 R
6,271,748 B1    8/2001 Derbyshire et al.
(Continued)

FOREIGN PATENT DOCUMENTS

DE    10 2011 003712 A1    8/2012
EP          1354219 B1      5/2008

OTHER PUBLICATIONS

International Search Report dated Jan. 25, 2019, in corresponding PCT/FR2018/052731 (4 pages).

*Primary Examiner* — Andre J Allen
(74) *Attorney, Agent, or Firm* — Venable LLP

(57) ABSTRACT

A method of detecting a leak from a tire of a vehicle, the tire including a member for measuring the pressure and the temperature having a driving operating mode and a stationary operating mode, comprising determining that the vehicle is stationary; and then launching the stationary operating mode to detect when the vehicle is stationary the presence or the absence of a leak of inflating gas from the tire.

18 Claims, 1 Drawing Sheet

(58) Field of Classification Search
CPC . B60C 23/064; B60C 23/007; B60C 23/0479; B60C 23/062; B60C 23/003; B60C 23/0401; B60C 23/0413; B60C 23/0488; B60C 23/0498; B60C 23/043; B60C 23/06; B60C 23/0452; B60C 23/0467; B60C 11/246; B60C 23/02; B60C 99/006; B60C 23/0428; B60C 23/0442; B60C 23/009; B60C 23/0425; B60C 2019/004; B60C 23/004; B60C 11/243; B60C 23/045; B60C 23/0464; B60C 23/0472; B60C 23/066; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/0483; B60C 11/0318; B60C 23/0459; B60C 23/0471; B60C 23/0481; B60C 23/042; B60C 23/12; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/0484; B60C 23/0486; B60C 23/08; B60C 17/00; B60C 2019/006; B60C 23/001; B60C 25/142; B60C 17/02; B60C 23/0445; B60C 5/004; B60C 11/0083; B60C 25/145; B60C 29/00; B60C 9/02; B60C 11/0332; B60C 23/0418; B60C 23/0457; B60C 25/18; B60C 11/13; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/04985; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/067; B60C 23/18; B60C 25/02; B60C 7/12; B60C 11/02; B60C 17/0009; B60C 19/002; B60C 19/08; B60C 19/12; B60C 2019/007; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02

USPC .................................................. 73/146–146.8
See application file for complete search history.

(56) References Cited

U.S. PATENT DOCUMENTS

| | | |
|---|---|---|
| 6,545,599 B2 | 4/2003 | Derbyshire et al. |
| 9,469,167 B2 | 10/2016 | Schwab et al. |
| 2002/0044050 A1 | 4/2002 | Derbyshire et al. |
| 2002/0130771 A1* | 9/2002 | Osborne ............. B60C 23/0401 340/438 |
| 2006/0082451 A1 | 4/2006 | Shaw |
| 2006/0244581 A1* | 11/2006 | Breed ................. B60C 23/0408 340/447 |
| 2013/0319085 A1 | 12/2013 | Schwab et al. |
| 2014/0070936 A1* | 3/2014 | Schwab ............. B60C 23/0481 340/447 |
| 2014/0095013 A1* | 4/2014 | Wagner .............. B60C 23/0406 701/29.1 |
| 2019/0225034 A1* | 7/2019 | Van Wiemeersch ........................ B60C 23/0455 |
| 2020/0070596 A1 | 3/2020 | Muhlhoff et al. |

\* cited by examiner

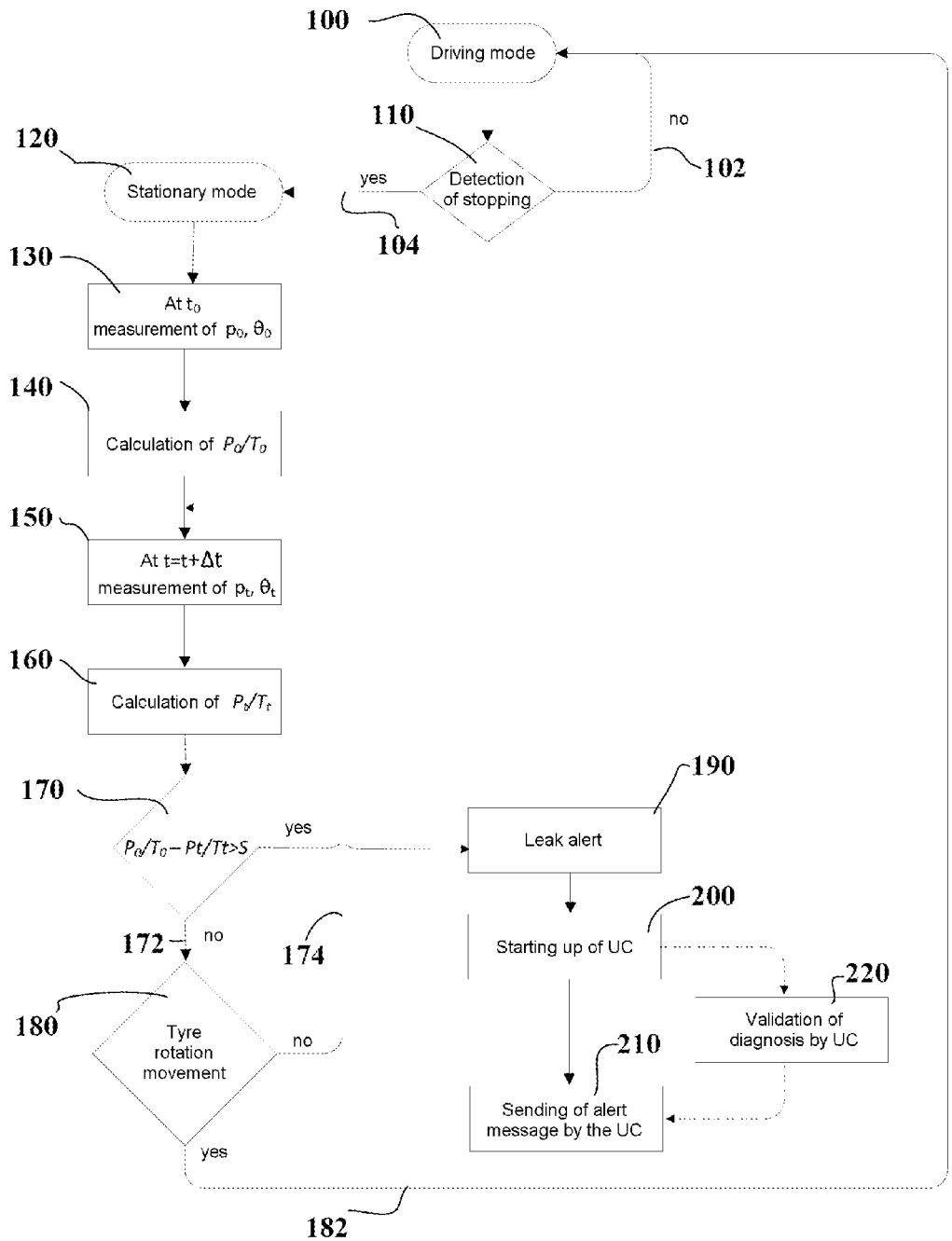

METHOD FOR DETECTING A LEAK IN A TIRE OF A STATIONARY VEHICLE

FIELD OF THE INVENTION

The present invention relates to a method for detecting a leak in a tyre of a vehicle. It more particularly concerns the exploitation of measurements taken when the vehicle is stationary.

PRIOR ART

The known inflation pressures of the tyres is not sufficient to provide to the driver of a vehicle information that is reliable and useful. Continuous consultation of these indications moreover risks being laborious rather than really useful. Indeed, the measurements of pressure and/or of temperature of the inflation gas in the internal cavity of the tyres varies enormously when driving because of the heating caused by hysteresis losses of the mixtures constituting it, the influence of the heat given off by the brakes, and the transfers of load caused by slight variations in the volume of the tyres. This is why the usual vehicle tyre pressure monitoring systems (TPMS) most often merely alerts the driver in the event of an inflation pressure of a tyre less than of the order of 20% of the nominal inflation pressure when cold in the case of private vehicles. This nominal inflation pressure when cold is specified by the manufacturers of the vehicle. These usual systems also issue an alert if the inflation pressure is below 1.5 bar for private vehicles, the minimum inflation pressure according to the recommendations of the European Tyre and Rim Technical Organization (ETRTO).

For a few years tyres have been sold including on their internal surface a layer of self-blocking product. The purpose of these viscous or pasty elastic products is to block holes caused by a perforating object piercing the wall of a tyre.

These self-blocking products do not enable complete elimination of the risk of a flat tyre following a perforation, but have nevertheless made it possible to reduce that risk significantly. It is also noted that a very great proportion of the residual leaks are slow or very slow leaks that can operate for a few days or even a few weeks before being detected by current tyre pressure management systems (TPMS) and it is very often the user of the vehicle who discovers upon returning to their vehicle that one of the tyres of the latter is flat and therefore unsuitable for driving on.

SUMMARY OF THE INVENTION

The invention has for subject matter a method for detecting a leak from a tyre of a vehicle, the tyre including a member for surveillance of the tyre with sensors for measuring the pressure and the temperature and having a driving operating mode and a stationary operating mode, in which:
it is determined that the vehicle is stationary; then
said stationary operating mode is launched to detect when the vehicle is stationary the presence or the absence of a leak of inflating gas from the tyre.

Advantageously, after the stationary operating mode of the member has been launched:
there are periodically measured the pressure $p_g$ and the temperature $\theta$ of the gas in the internal cavity of the tyre;
the series of pressure and temperature values and the measurement times are stored in non-volatile memory;
the measured pressure $p_g$ is converted to an absolute pressure P and the measured temperature $\theta$ is converted to an absolute temperature T, the ratio P/T is calculated and a series of values is obtained;
if said series of values decreases by an amount above a given threshold, an alert is triggered.

When the vehicle is stationary, the sources of interference with the measurements from the measurement member are reduced and it is easier to detect small variations in the inflation pressure linked to slow or very slow leaks.

As is well known to the person skilled in the art, monitoring the ratio P/T makes it possible to minimize the consequences of temperature variations in the accuracy of the measurements. This ratio is proportional to the number of moles of gas present in the internal cavity of the tyre.

In accordance with one embodiment, the measurement period is constant and between 30 minutes and 60 minutes inclusive.

In accordance with this embodiment, a measurement is taken every 30 minutes for example.

In accordance with an alternative embodiment, the measurement period continuously increases between two measurements, or at least during a given number of measurements.

The measurement period may increase after each measurement by a factor between 1.5 and 4 inclusive.

By way of example this period may for example be doubled after each measurement. There is therefore a first measurement on launching the stationary operating mode of the member, then a second one 15 minutes later, a third one 30 minutes later, then 1 hour later, then 2 hours later, and so on. This embodiment enables the number of measurements and the consumption energy from the energy source of the member to be limited.

It is nevertheless to be noted that effecting and processing the measurements consumes much less energy than sending an alert message to the exterior of the member.

In accordance with an advantageous embodiment, the measurement period is constant if it exceeds a given threshold and preferably if said period is greater than or equal to one week.

The alert triggering threshold may be between 2 and 7% inclusive of the ratio P/T.

In accordance with an alternative embodiment, the alert triggering threshold may correspond to a variation between 50 and 200 mbar inclusive and preferably between 100 and 150 mbar inclusive of the pressure of the gas in the internal cavity of the tyre.

There may be taken as a reference the last measurements of pressure and temperature obtained in the driving operating mode of the member. It is also possible to take as a reference the first measurements obtained after launching the stationary operating mode of the member.

In accordance with a preferred embodiment, on triggering the alert an alert message is sent to at least one pre-identified addressee.

Those addressees may include the user of the vehicle, an address of a garage where the leak is likely to be able to be repaired and/or a seller of tyres.

In accordance with a preferred embodiment, the vehicle including a central unit for surveillance of the tyres of the vehicle, upon the triggering of an alert by a member of a tyre, that alert is transmitted to at least one pre-identified recipient via said surveillance central unit.

This central unit is then able to validate the detection of a leak diagnosis and use its communication means to transmit an appropriate alert message to the pre-identified addressee.

As appropriate, the alert message may be relayed to an external server or to an Internet site or directly to a predetermined mobile telephone or smartphone. It may also be transmitted by electronic mail.

A plurality of means may be used to determine that the vehicle is stationary. For example, the vehicle including a circuit for powering the dashboard, it may be determined that the vehicle is stationary when the powering circuit is open.

If the member includes an accelerometer for detecting a movement of rotation of the tyre, it is possible to determine that the vehicle is stationary by the absence of any signal linked to the rotation of the tyre for a time above a given threshold.

The threshold for triggering stopping of the vehicle and launching of the stationary mode may be between 15 and 20 minutes inclusive for example.

Finally, the stationary operating mode of the member switches to the driving operating mode if it is identified that the vehicle is no longer stationary.

The tyre advantageously includes on at least a part of its interior wall a layer of self-blocking product.

The vehicle may also have an autonomous driving mode. In this case there is meant by "driver of the vehicle" all of the elements enabling the autonomous driving of the vehicle.

The method according to any of the objects of the invention is particularly suitable in the case of such vehicles because it has the advantage of warning of a tyre problem before any attempt to return the vehicle to service.

Definitions

The following abbreviations are used in the text of the application:
p, relative inflation pressure of the gas in the internal cavity of a tyre;
P, absolute inflation pressure; $P = p + p_{atm}$;
$p_{atm}$, atmospheric pressure equal to 101.325 kPa under standard conditions;
θ, temperature in degrees Celsius of the gas in the internal cavity of a tyre;
T, absolute temperature in Kelvins (degrees Celsius + 273.16).

DESCRIPTION OF THE FIGURE

The appended FIG. 1 is a schematic of the stationary operating mode of a surveillance member.

DETAILED DESCRIPTION

FIG. 1 shows a diagram of the main steps of the stationary operating mode of a surveillance member according to one of the objects of the invention.

The surveillance member in question is disposed in the internal cavity of a tyre of a vehicle and is equipped in particular with a pressure sensor, a temperature sensor, a microprocessor, a non-volatile memory, a clock. The member is able to transmit and to receive radio signals. The member has a vehicle driving operating mode and a vehicle stationary operating mode.

The driving operating mode usually enables the driver of the vehicle to be alerted in the event of loss of pressure in the tyre, in particular if the pressure decreases by more than 20% of the nominal relative pressure value when cold specified by the manufacturer of the vehicle.

This surveillance member forms part of a surveillance system for the tyres of the vehicle made up of four surveillance members, one for each tyre, and a central unit or UC. In driving operating mode the UC periodically receives measurements taken by the members, processes them and transmits for the attention of the driver or of any other pre-identified addressee messages appropriate to the state of the tyres.

In the step 100 the surveillance member is in driving operating mode. The vehicle is either moving or stationary but without the criteria for detection of stopping being satisfied.

In the step 110 the member tests the detection of stopping. That detection may be linked to the opening of the circuit for powering the dashboard, absence of the signal linked to rotation of the tyre for a duration of greater than 15 or 20 minutes, or any other agreed test.

If the criterion or the criteria for detection of stopping are not satisfied, the driving mode continues (loop 102).

Otherwise, the operating mode of the surveillance member switches to the stationary operating mode (loop 104).

At the moment of switching to the stationary operating mode, at to, the member takes a measurement of at least the relative inflation pressure $p_0$ and the temperature $θ_0$ of the gas in the internal cavity of the tyre (step 130).

The member calculates the absolute inflation pressure $P_0$ from the relative pressure and the absolute temperature in Kelvins:

$P_0 = p_0 + p_{atm}$, where $p_{atm}$ is atmospheric pressure;
and $T_0 = θ_0 + 273.16$ The member then calculates the ratio $P_0/T_0$ (step 140).

Thereafter the member measures periodically the relative pressure and the temperature of the gas in the internal cavity of the tyre.

By way of example, at $t = t + \Delta t$, it measures $p_t$ and $θ_t$ (step 150).

The member then obtains the absolute pressures and the absolute temperatures and calculates the ratio: $P_t/T_t$ (step 160).

In the step 170, the member tests the value of the ratio $P_t/T_t$ relative to the initial ratio taken as the reference:

$P_0/T_0 - P_t/P_t \varnothing S$

If the difference is below the threshold S (loop 172), the member tests whether or not the vehicle is still stationary (step 180). In the embodiment from FIG. 1, it is tested whether or not starting of rotation of the tyre has been detected, for example using an accelerometer of the surveillance member.

If the two tests 170 and 180 are negative, the measurement step 150 is repeated after a period Δt greater than or equal to the previous one (loop 172).

If the test 170 is positive, that is to say the difference between the two values, initial value and value at t, is greater the threshold S, the member concludes in the step 190 that there is a leak of gas from the internal cavity of the tyre. The member then sends a start-up and alert signal to the central unit UC of the surveillance system for the tyres of the vehicle (step 200). The UC then transmits to at least one pre-identified addressee an alert message warning of leak from the corresponding tyre.

Optionally, after starting up the UC, the member may transmit to the UC all of the measurements carried out in the stationary operating mode (step 220).

This optional step has the advantage of enabling the UC to validate or invalidate the leak diagnosis and to adapt the message sent to the pre-identified addressee as a function of the intensity of the leak detected:
- if the leakage rate is for example less than 0.05 or 0.10 bar per month, these are natural inflation losses and no message is of any use if the inflation pressure is correct;
- if the leakage rate is greater than 0.10 bar/month and less than 1 bar per week, this is an abnormal leak and it is necessary to alert the pre-identified addressee and to advise them to have the tyre concerned inspected;
- if the leakage rate is greater than 1 bar per week, this is a rapid leak and the message may be inspect the tyre concerned as soon as possible and prohibit driving if the inflation pressure is close to or below 1.5 bar.

Of course, the messages sent may be adapted as a function of the measured relative inflation pressure of the tyre.

Finally, if the test 180 is positive, the surveillance member switches from the stationary operating mode to the driving operating mode (loop 182) until the next time the vehicle stops.

To implement the method of the invention, there may be used a surveillance device as described in the applicant's patent EP1354219 B1.

The invention claimed is:

1. A method for detecting a leak from a tire of a vehicle, the tire including a member for surveillance of the tire with sensors for measuring pressure and temperature and having a driving operating mode and a stationary operating mode, and the method comprising:
- determining that the vehicle is stationary;
- then launching the stationary operating mode to detect, when the vehicle is stationary, a presence or an absence of a leak of inflating gas from the tire;
- after launching the stationary operating mode of the member, periodically measuring the pressure pg and the temperature $\theta$ of the inflating gas in an internal cavity of the tire;
- storing a series of pressure and temperature values and measurement times in a non-volatile memory;
- converting the measured pressure pg values to absolute pressure P values and the measured temperature $\theta$ values to absolute temperature T values and calculating a ratio P/T to obtain a series of values; and
- if the series of values decreases by an amount above a given threshold, triggering an alert.

2. The method according to claim 1, wherein a measurement period is constant and between 30 minutes and 60 minutes inclusive.

3. The method according to claim 1, wherein a measurement period increases continuously during at least a given number of measurements.

4. The method according to claim 3, wherein the measurement period increases after each measurement by a factor between 1.5 and 4 inclusive.

5. The method according to claim 3, wherein the measurement period is constant if it exceeds a given threshold.

6. The method according to claim 1, wherein the threshold is between 2 and 7% inclusive of the ratio P/T.

7. The method according to claim 1, wherein the threshold corresponds to a variation between 50 and 200 mbar inclusive of the pressure of the inflating gas from the internal cavity of the tire.

8. The method according to claim 6, wherein the last measurement or measurements of pressure and of temperature obtained in the driving operating mode of the member are taken as a reference for the ratio P/T.

9. The method according to claim 6, wherein the last measurement or measurements of pressure and of temperature obtained in the stationary operating mode of the member are taken as a reference for the ratio P/T.

10. The method according to claim 1, wherein, upon triggering the alert, an alert message is sent to at least one pre-identified addressee.

11. The method according to claim 10, wherein, the vehicle including a central unit for surveillance of the tires of the vehicle, upon triggering the alert, the member of the tire transmits the alert message to at least one pre-identified recipient via the surveillance central unit.

12. The method according to claim 1, wherein the vehicle includes a circuit for powering up a dashboard, and wherein determining that the vehicle is stationary is determined when the power up circuit is open.

13. The method according to claim 1, wherein determining that the vehicle is stationary is determined by virtue of an absence of weight on a seat of a driver.

14. The method according to claim 1, wherein the member includes an accelerometer for detecting a movement of rotation of the tire, and wherein determining that the vehicle is stationary is determined by an absence of any signal linked to movement in rotation of the tire for a time above a given threshold.

15. The method according to claim 14, wherein determining that the vehicle is stationary is determined after between 15 and 60 minutes inclusive.

16. The method according to claim 1, wherein the stationary operating mode switches to the driving operating mode if it is identified that the vehicle is no longer stationary.

17. The method according to claim 1, wherein the tire includes on at least a part of its interior wall a layer of a self-blocking product.

18. The method according to claim 1, wherein the vehicle has an autonomous driving mode.

* * * * *